(No Model.) 5 Sheets—Sheet 2.

F. A. FRICK.
MACHINE FOR MAKING PIPE STEM CLEANERS.

No. 563,367. Patented July 7, 1896.

Witnesses.
Thomas Durant.
Wallace Murdock.

Inventor.
Frederick A. Frick
by Church & Church
his Atty's

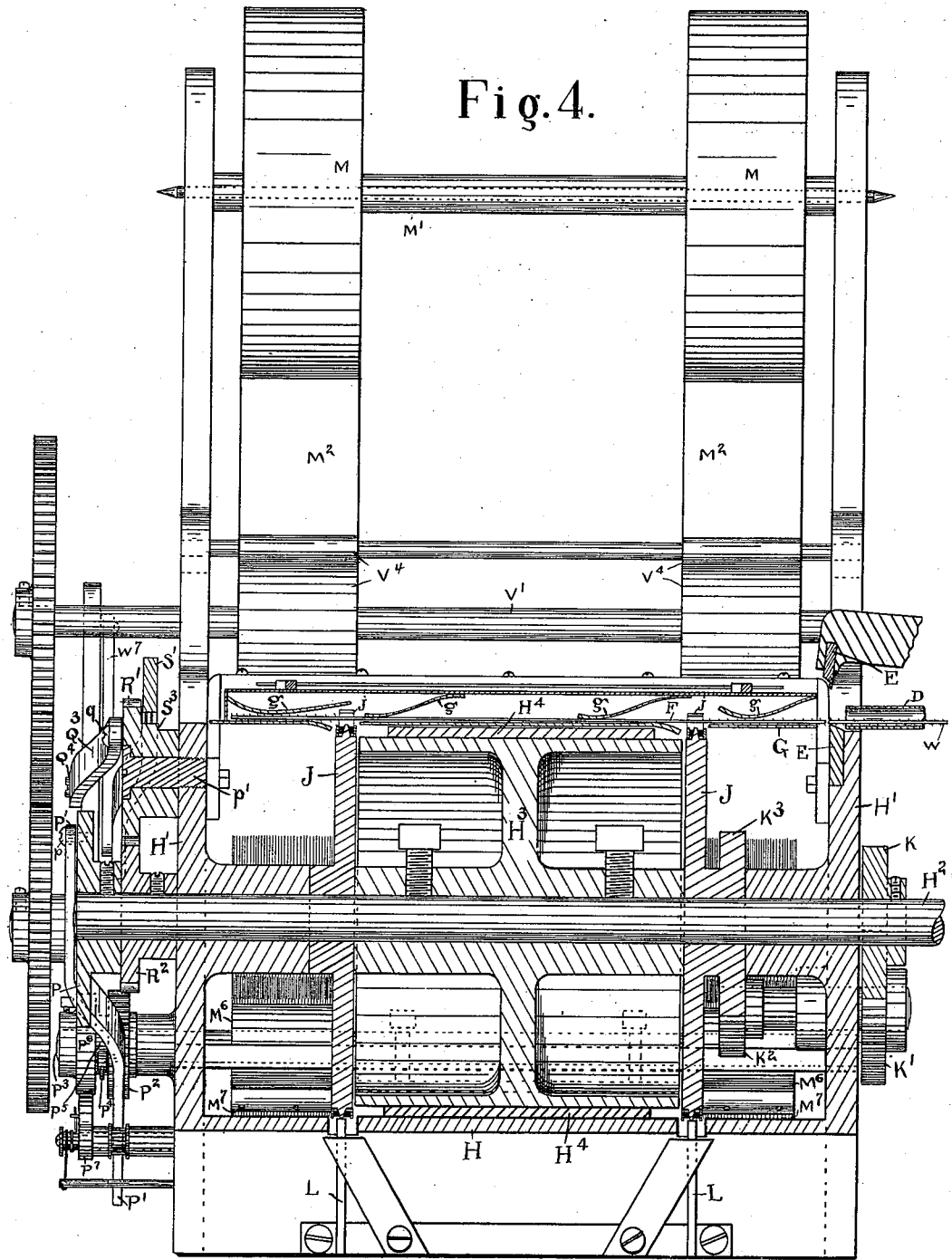

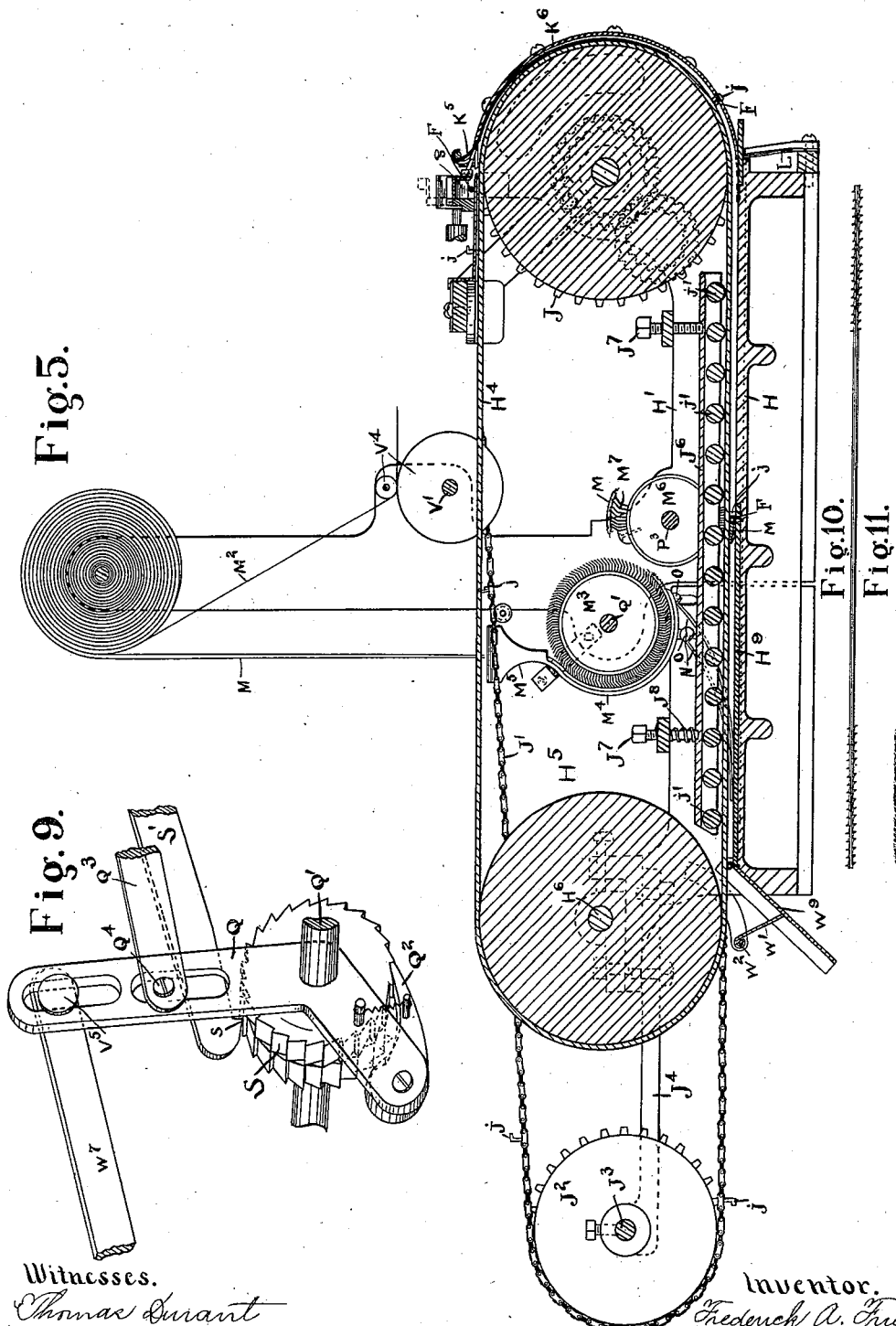

(No Model.) 5 Sheets—Sheet 5.
F. A. FRICK.
MACHINE FOR MAKING PIPE STEM CLEANERS.
No. 563,367. Patented July 7, 1896.
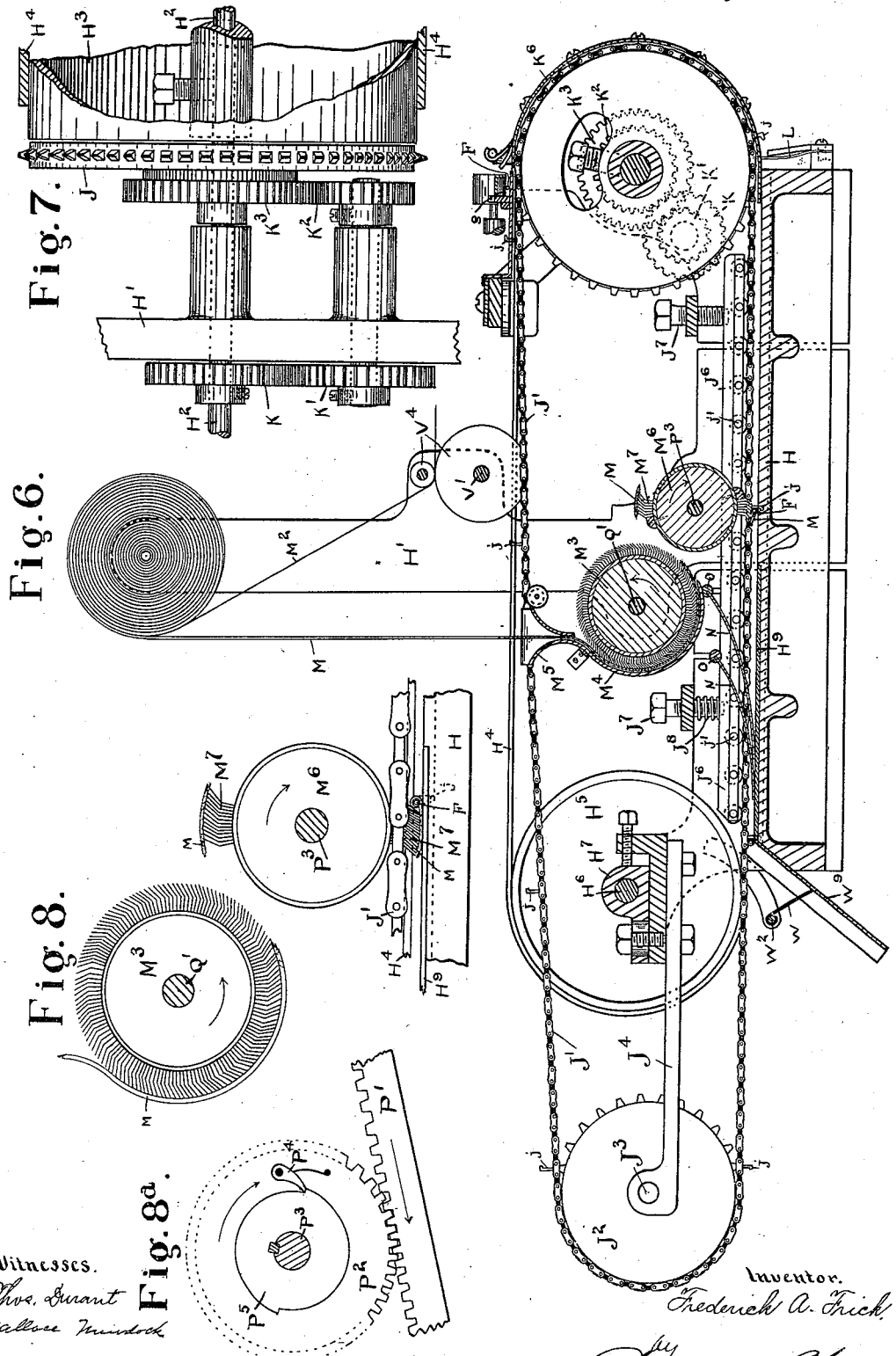
Witnesses.
Thos. Durant
Wallace Murdock
Inventor.
Frederick A. Frick,
by French & Church
his Atty's.

UNITED STATES PATENT OFFICE.

FREDERICK A. FRICK, OF ROCHESTER, NEW YORK, ASSIGNOR TO THE WILLARD & FRICK MANUFACTURING COMPANY, OF SAME PLACE.

MACHINE FOR MAKING PIPE-STEM CLEANERS.

SPECIFICATION forming part of Letters Patent No. 563,367, dated July 7, 1896.

Application filed September 17, 1895. Serial No. 562,803. (No model.)

*To all whom it may concern:*

Be it known that I, FREDERICK A. FRICK, of Rochester, in the county of Monroe and State of New York, have invented certain new and useful Improvements in Machines for Making Pipe-Stem Cleaners; and I do hereby declare the following to be a full, clear, and exact description of the same, reference being had to the accompanying drawings, forming a part of this specification, and to the letters of reference marked thereon.

My present invention has for its object to provide a machine for making pipe-stem cleaners, such as is contained in my application for Letters Patent, Serial No. 532,567, filed December 21, 1894, which consists of a piece of wire or similar material having upon each of its opposite ends two series of barbs or projections extending in opposite directions and a covering of fibrous material, such as cotton, held in position by the barbs and prevented from longitudinal movement on the wire when the latter is pushed or pulled through the pipe-stem to clean it.

The machine shown in my present application embodies, generally, in its construction suitable devices for forming the barbs upon the wire forming the base of the pipe-cleaner and severing the wire at suitable intervals, and more particularly the device for applying a covering of fibrous material to the barbed portions of the wire, thereby completing the cleaners.

In another application, Serial No. 562,804, filed simultaneously herewith, I have shown and described in detail a preferred mechanism employed by me for barbing and cutting the wire, and have in the present application indicated such machine generally, and I propose describing only its essential characteristics and claim it herein only as one form of device for preparing the wire and delivering it to the apparatus for covering the barbed portion with fibrous material and completing the cleaner.

Figure 1:
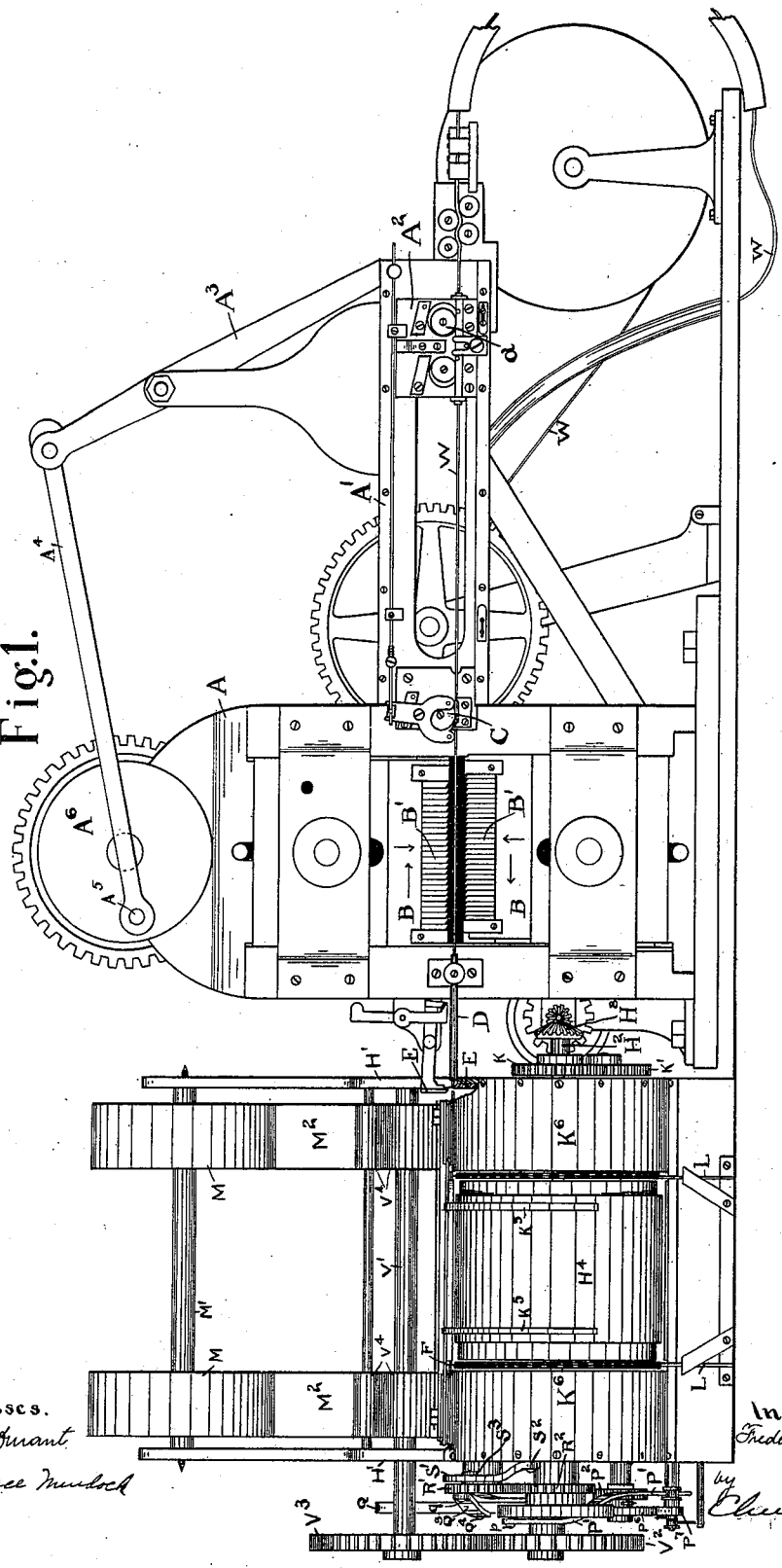
Figure 2:
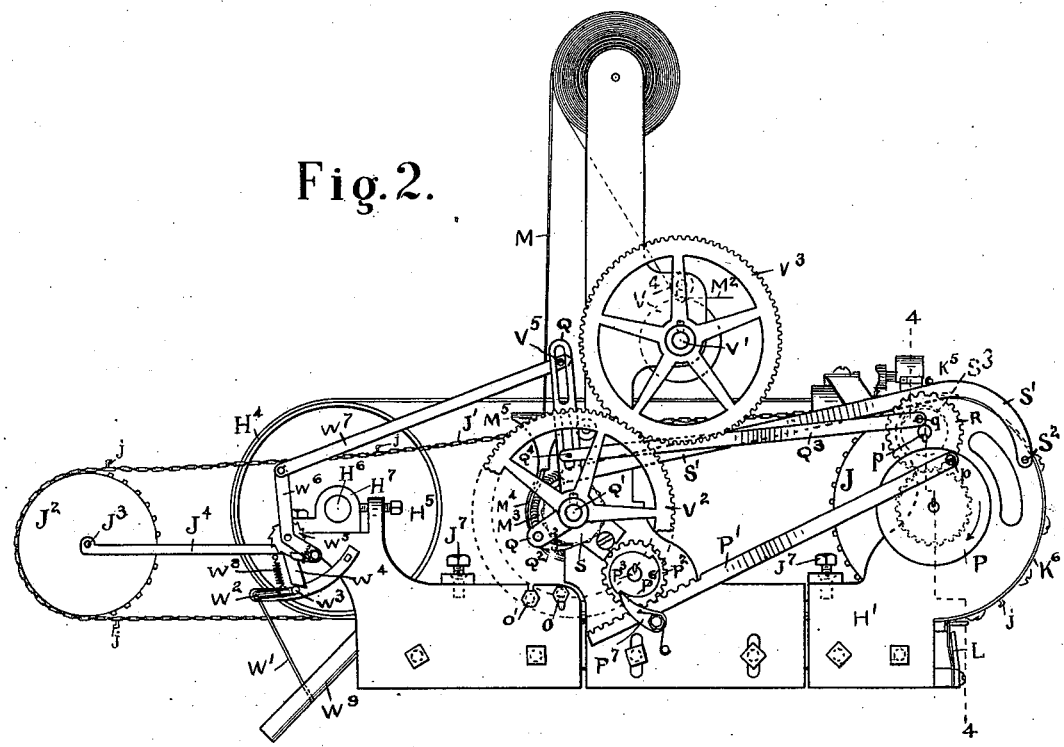
Figure 3:
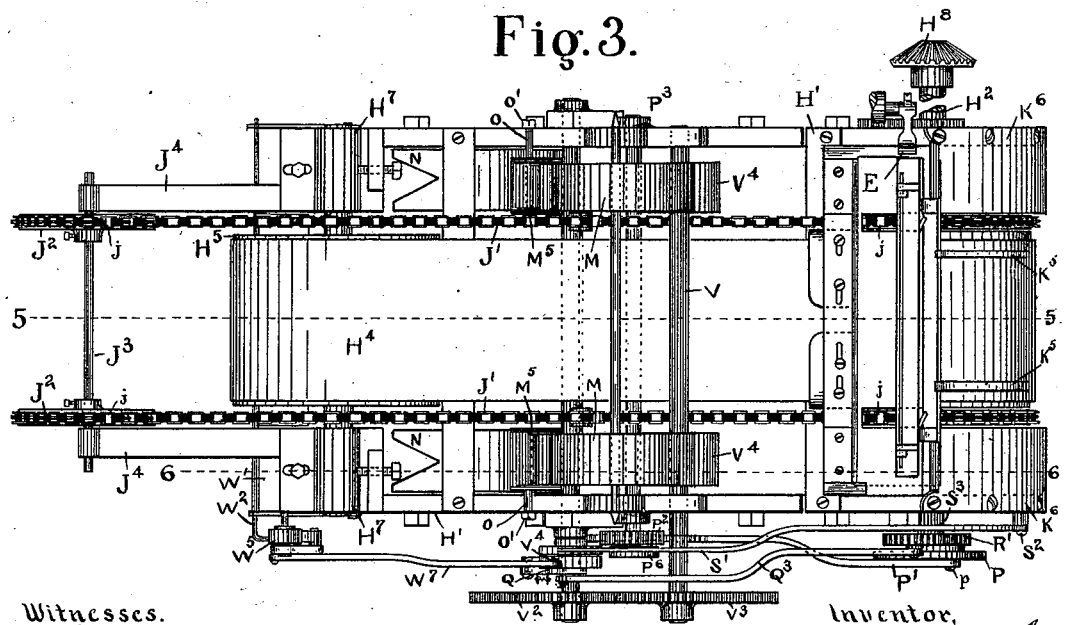

In the accompanying drawings, Figure 1 is an elevation of the machine constructed in accordance with my invention, showing the relation that the wire barbing and cutting mechanism bears to the covering device; Fig. 2, a side view of the covering device; Fig. 3, a plan view of the same; Fig. 4, a vertical sectional view on the line 4 4 of Fig. 2; Fig. 5, a longitudinal sectional view on the line 5 5 of Fig. 3; Fig. 6, a longitudinal sectional view on the line 6 6 of Fig. 3; Fig. 7, a detail view of part of the driving mechanism; Fig. 8, an enlarged view showing the devices for delivering the covering or fibrous material to the wire; Fig. 8$^a$, a detail view; Fig. 9, a detail perspective view of the mechanism for actuating the covering-feeding device; Fig. 10, a side view showing the manner in which the wire for the cleaners is barbed and cut; Fig. 11, a similar view of the complete pipe-cleaner.

Similar reference-letters in the several figures indicate similar parts.

The portion of the machine which barbs and severs the wire for the base of the cleaner forms the subject-matter of my other application, before referred to, and is indicated herein particularly in Fig. 1, A indicating the main frame having an extension A' forming a way in which operates the wire-feeding slide A$^2$, having a suitable wire-clamp $a$, and reciprocated in the way by means of a lever A$^3$, connected by the pitman A$^4$ to the wrist-pin A$^5$ on the disk A$^6$, rotated by suitable mechanism.

B B indicate die-carriers having on the proximate sides dies B', preferably composed of separate cutting-teeth oppositely disposed and actuated by suitable mechanism toward and from each other and also relatively laterally in opposite directions, as indicated by the arrows in Fig. 1.

C indicates a wire-clamp adapted to grasp and hold a wire W at suitable times.

D is a wire-guide, beyond which is located a wire-severing device embodying relatively movable cutters E.

The operation of this portion of my invention, as will appear from my pending application, is as follows: The dies are brought together upon the wire W between them and then are moved laterally in opposite directions to turn up the burs, as shown in Fig. 10. Then the wire-feeding slide is moved toward the die, from the position shown in Fig. 1, (the clamping or gripping device $a$ thereon grasping it firmly,) the stationary wire-gripper C being released from the wire as the slide moves forward toward the die. The previously-barbed portion of the wire is pushed through the guide D until the center of the barbed portion is between the cutters E. Then the cutters are operated and the wire severed at the same time that a new portion is barbed by means of the die and while the slide is moving back to obtain a new grip on the wire. The severed piece of wire, as shown in Fig. 4 and indicated by the letter F, has barbs upon its opposite ends and is laid upon a receiving-plate G, forming the bottom of a box or receptacle having springs $g$, which hold it down upon the plate G, as shown particularly in Fig. 4, this being the manner of introducing the barbed wire to the covering apparatus, which I will now proceed to describe. The frame of this covering apparatus embodies a suitable base or bottom plate H and sides H', which may be of any suitable construction adapted for the purpose, and journaled in suitable bearings in said side plates is a shaft $H^2$, to which is secured a drum or belt-pulley $H^3$, and around this passes a wide belt $H^4$, slightly narrower than the space between the barbed portions of the wires, also passing around a corresponding pulley $H^5$ on the shaft $H^6$, supported in adjustable bearings $H^7$. The shaft $H^2$ has upon its inner end a beveled pinion $H^8$, through which motion is transmitted to the machine. Loosely journaled upon the said shaft upon opposite sides of the pulley $H^3$ are sprocket-wheels J, connected by sprocket-chains J' with corresponding wheels $J^2$, mounted on the shaft $J^3$, supported in bearings in arms $J^4$, attached to the frame. These chains are provided at suitable intervals with carrying lugs or projections $j$, which are adapted to move the cleaner-wires through the machine, as will be presently described. These carrying projections $j$ project above the surface of the belt $H^4$ where it passes around the pulley $H^3$ and also extend beyond the lower horizontal stretch of said belt, suitable slots being formed in the bed-plate for their accommodation.

Arranged in the bottom plate H are preferably three thin pieces of wood, (indicated by $H^9$,) the central one being arranged beneath the belt $H^4$ and the two outside ones between the sprocket-chain and the side plates of the frame, and above the lower stretch of this belt $H^4$ is arranged a frame $J^6$, having rollers $j'$ thereon resting upon the inner side of the belt, said frame being prevented from longitudinal movement by screws $J^7$, which loosely enter sockets in its upper side, and it may be pressed down by said screws, if desired, though this is unnecessary, as springs $J^8$, encircling the screws and bearing against the frame, hold it with a yielding pressure.

The object of employing the wooden piece below the belt is to offer friction to the cleaner-wire, which is pressed upon the bed by the belt so as to insure its being rolled or turned, and by means of the adjusting-screws the pressure of the belt upon the cleaner-wire can be regulated, if desired.

The sprocket-wheels J are moved at a slightly less surface speed than the pulley $H^3$, the motion being communicated to one of the former by means of the gears K K' $K^2$ $K^3$, the first being attached to the shaft $H^2$ and the last connected to or formed with the sprocket J.

It will be understood that the cleaner-wires, after being barbed and severed and when delivered upon the receiving-plate G, are moved out of the receptacle of which the latter forms the bottom by the conveying-lugs $j$ on the sprocket-chain, being held against the belt $H^4$ where it turns around a pulley $H^3$ by suitable light springs $K^5$, attached at their upper ends to the frame, while the barbed ends of the wires are protected by covering-plates $K^6$, extending around the periphery of said roller $H^3$. These springs $K^5$ prevent the wires from dropping down and becoming misplaced, and in order that the wires may be alined I provide yielding stops, in the shape of light spring-arms L, projecting in the path of the wires and serving to retain them until positively carried forward beneath the belt $H^4$ by means of the lugs on the sprocket-chain. These spring-arms L readily yield when the wires are positively moved forward by the lugs on the chains.

The belt $H^4$, moving faster than the sprocket-chains, will press the wires against the pieces of wood $H^9$ and cause said wires to rotate on their axes, and the fibrous material, preferably absorbent cotton, is placed in the path of the barbed ends of the wires, so that as they revolve said material will be caught by the barbs and wound around them.

Any suitable means may be employed for feeding the cotton into position to be engaged by the rotating wires, but I prefer the construction shown in the drawings, in which I employ a separate cotton-feeding device for each end of the wire, located, preferably, on opposite sides of the machine, and as the two devices are the same a description of one will suffice.

The cotton M is in the form of strips or bats wound upon a spindle M', loosely supported in suitable bearings, and said strip is wound with the strip of paper or similar material $M^2$ between each convolution, and the strips of cotton pass from the roll to a cylinder $M^3$, having a covering of carding-cloth or similar toothed material, with which coöperates a guard or guide $M^4$, having a guide $M^5$ at its upper end, said wheel $M^3$ serving to draw down the cotton and present it in such manner that a portion may be detached and delivered to the rotating barbed wire.

The cotton-delivering device in the present embodiment consists of a wheel or roller $M^6$, having at two or more points on its periphery sections of card-cloth $M^7$, or similar toothed material, and it is so disposed relative to the bed of the machine that the portion of cotton removed from the roller $M^3$ by the card-cloth section is delivered in position to be grasped by the barbed portions of the wires, as shown particularly in Figs. 6 and 8, when these wires, readily rotating, will wind the cotton about them, being propelled by the conveyer and rotated by the belt, and they will pass beneath spring-plates N N, arranging in position over the bed-plate, so that the cotton will be compacted and wound tightly upon the wires, completing the cleaners.

In order that the tension of the springs N N may be adjusted, I secure them to spindles O, journaled in suitable slots in the sides of the frame and provide upon the outer ends securing-nuts O', so that they may be secured in any position to which they may be adjusted, a slight shoulder being formed on said spindles to engage with the inner sides of the frame, affording an abutment.

As there is a perceptible interval of time between the passage of the barbed wires through the machine, it is important that the cotton-feeding device be intermitting in its action, in order that the predetermined amount of cotton may be applied to the said wires, and though other forms of mechanism could be employed for this purpose I prefer that shown herein, constructed as follows:

Upon the outer end of the shaft $H^2$ is secured a disk P, having a wrist-pin $p$, to which is connected a rack-bar P', the teeth of which mesh with a pinion $P^2$, loose upon the shaft $P^3$, carrying the roller $M^6$. (See Fig. 8$^a$.) This pinion carries a spring-pawl $P^4$, meshing with a ratchet-wheel $P^5$, secured to the shaft, and upon the outer end of the shaft $P^3$ is a ratchet-wheel $P^6$, having teeth corresponding in number to the card-cloth sections (in the present construction only two teeth being employed) with which coöperate a spring-operated pawl $P^7$, mounted on the frame, and from this construction it will be seen that at each revolution of the shaft $H^2$ the shaft $P^3$ will be given a half-rotation and its backward movement prevented by the pawl $P^7$ during the backward movement of the rack-bar. This movement is sufficient to cause a carding-cloth section $M^7$ to detach a portion of the cotton from that on the cylinder $M^3$ and present it in position to be removed therefrom by the wires. The roller $M^3$ is also rotated a distance corresponding with the amount of cotton removed from its surface by means of a rock-arm Q, loose upon the shaft Q' of said roller and carrying a pawl $Q^2$, said arm being operated by the pitman $Q^3$, connected to the wrist-pin $q$ on the gear R', mounted upon a bolt $p'$ on the frame, said gear being in mesh with a pinion $R^2$ on the shaft $H^2$, as shown particularly in Fig. 4. Also secured to the shaft Q' is a reversed ratchet S, with which engages a tooth $s$ on the lever S', which is pivoted at $S^2$ to the frame and passing over a cam $S^3$, formed upon or attached to a pinion R'. From this construction it will be seen at each rotation of the gear R' the shaft Q' will be operated the distance required, which may be regulated by the adjustable block $Q^4$, forming the connection between the pitman $Q^3$ and the rock-arm Q. As soon as the required motion in the direction indicated by the arrow in Fig. 8 has been given the shaft Q' further rotation of the shaft is arrested by the lever S', which has been riding upon the cam $S^3$, and when dropped its tooth $s$, engaging the ratchet-wheel S, prevents the forward rotation of the pulley $M^3$, which might otherwise happen, owing to the engagement of the card-cloth section on the pulley $M^6$, which operates when the pulley $M^3$ is stationary.

In order that the cotton may be readily unwound from the roll, and that in proper quantity, without the liability of tearing it, I extend the paper or other material which is wound with it over rollers V, mounted upon a shaft V' and connected by gear $V^2$ $V^3$ with the shaft Q', as shown particularly in Fig. 2, small rollers $V^4$ pressing said paper upon the periphery of rollers V.

The operations of these parts are timed as follows: The cotton is drawn down by the cloth-covered roll $M^3$ and arrested. Then the roller $M^6$ makes a half-revolution, one of the card-cloth sections removing a quantity of cotton, just sufficient for application to one end of the barbed wire, and the roller $M^6$ is then arrested in the position shown in Figs. 6 and 8. The rotating wire passing beneath the roller $M^6$ removes the cotton from the lowermost section $M^7$, and meantime the roller $M^3$ has been moved again, so that at the next half-rotation of the wheel $M^6$ another section of cotton may be removed. In other words, the roller $M^3$ is moved the proper distance after each half-rotation of the wheel $M^6$.

The completed cleaners are preferably allowed to fall into a chute $W^9$, provided with a gate W', connected to a rock-shaft $W^2$, having an arm $W^3$, moved in one direction by the spring $W^8$, and in the other by an arm $W^4$, connected to a ratchet-wheel $W^5$, operated by a pawl on the rock-arm $W^6$ and actuated by the pitman $W^7$, adjustably connected to the upper portion of the rock-arm Q, the parts being arranged so that at each cotton-feeding operation the ratchet-wheel $W^5$ will be moved one tooth, and when the desired number of operations have taken place, which will of course be equal to the number of completed cleaners arrested by the gate W', the arm $W^4$ will open the gate and permit the cleaners to pass down the chute.

Of course the number of cleaners arrested by the gate can be changed by varying the number of teeth in the ratchet $W^5$ and the adjustment of the block $V^5$, which forms a connection between the pitman $W^7$ and the slotted end of the rock-arm Q. This last-described device is convenient when it is desired to place the cleaners in packages containing, say, a dozen, but of course is not essential, and other suitable counting devices can readily be substituted.

I do not wish to be confined to precisely the mechanisms shown herein for accomplishing the various operations, as other conveying and rotating devices can be readily substituted for those shown without departing from my invention, though I find in practice that the machine constructed precisely as shown and described herein will turn out from fifty to sixty completed pipe-cleaners per minute. Also, though I prefer to make the cleaners double, and have made my present machine to cover two ends at once, this is not essential, as one end only of the wire could be barbed, but when both are barbed they are well balanced while being covered and are prevented from twisting.

The belt and the bed may be considered, broadly, relatively movable surfaces, between which the wires are rotated, and though I prefer this arrangement for producing the rotation I do not wish to be confined precisely to it.

Although I prefer to employ the toothed holders for the cotton, from which it is taken by the wires, in the form of cylinders, as this enables me to have a motion in one direction only, it is not essential, because it is only necessary to present detached sections of cotton to the wires to prevent long strands from being drawn and to insure an even coating for each cleaner.

I claim as my invention—

1. The combination with wire barbing and severing devices, of mechanism for rotating the barbed wire, and feeding devices for supplying fibrous material to the barbed portion of the wires, substantially as described.

2. The combination with wire barbing and severing devices, of mechanism for rotating the barbed wire, and intermittingly-operating feeding devices for supplying fibrous material to the barbed portion of the wires, substantially as described.

3. The combination with intermittingly-operating wire feeding, barbing, and severing mechanisms, of conveying devices for moving the separated pieces of wire, devices for rotating the wire pieces, and feeding devices for delivering a determinate quantity of fibrous material to the barbed portion of the wires, substantially as described.

4. The combination with intermittingly-operating wire-feeding devices, wire-barbing dies movable relatively toward and laterally of each other, and a severing device for severing the wire intermediate of the length of the barbed portions, of devices for conveying and rotating the separated barbed wires, and two feeding devices for delivering a determinate quantity of fibrous material to the ends of the barbed wires, substantially as described.

5. In a machine for covering wires with fibrous material, the combination with devices for rotating and conveying said wires, of intermittingly-operating feeding devices for delivering a determinate quantity of fibrous material in the path of a portion of the wires, substantially as described.

6. In a machine for covering wire with fibrous material, the combination with devices for rotating and conveying said wires, of intermittingly-operating feeding devices for delivering a determinate quantity of fibrous material in the path of portions of the wires, and a support and shoe between which the covered portions of the wires pass to compact the covering, substantially as described.

7. In a machine for covering wire with fibrous material, the combination with two relatively-movable surfaces by which the wire is rotated, and a toothed holder for fibrous material arranged in the path of the wire, substantially as described.

8. In a machine for covering wire with fibrous material, the combination with devices for rotating the wire, a toothed holder for fibrous material, and an intermittingly-operating toothed holder for fibrous material coöperating with the first-mentioned one and movable in the path traversed by the wire, substantially as described.

9. In a machine for covering wire with fibrous material, the combination with devices for rotating the wire, a toothed cylinder, and a cylinder having detached toothed sections adapted to project in the path of the wire, and devices for intermittingly operating said cylinders, substantially as described.

10. The combination with a bed or support, a belt operating in proximity thereto, a wire-conveyer, a holder for fibrous material, and an elastic shoe beyond said holder in the path of the covered wire for compacting the coating, substantially as described.

11. The combination with the two feeding and holding devices for fibrous material, of wire rotating and conveying devices located between them, and covering-compacting devices in the path traversed by the covered ends of the wires, substantially as described.

12. The combination with the bed, the belt operating in proximity thereto, and the wire-conveyer, of holders for fibrous covering material arranged on each side of the belt and movable intermittingly in the path of the ends of the wire, and two compacting devices for compacting the covering on the ends of the wires, substantially as described.

13. The combination with devices for rotating barbed wires, of a roller having a toothed covering, a roller having detached sections of toothed material thereon coöperating with the former, and mechanism for operating said rollers intermittingly, whereby the last-mentioned roller may at intervals detach a portion of fibrous material from the other roller and present it in the path of the rotating wire, substantially as described.

14. As a means for feeding cotton-batting from a roll, the combination with a loosely-supported spindle for the roll, and a strip of stronger material between the convolutions of the roll, of a roller for receiving the cotton-batting, and a pair of rollers between which the paper strip is passed, and connections between said rollers and the batting-receiving roller whereby they are operated simultaneously, substantially as described.

15. The combination with the wire-receiving support and the springs for holding the wire, of the wire-conveyers, and belt, and the wheels and pulleys therefor, and the yielding stops for engaging and straightening the wires carried by the conveyers, substantially as described.

16. The combination with wire conveying and rotating devices, of the roller having detached sections of carding-cloth thereon projecting in the path of the wires, ratchet devices for rotating said roller, and a retaining-pawl for holding it, substantially as described.

17. The combination with the bed, the belt, the frame operating on the belt, and the sprocket-chains on opposite sides of the belt, having lugs, of intermittingly-operating feeding devices for supplying fibrous material in detached sections outside the sprocket-chains and in the path of the ends of wires carried thereby, substantially as described.

18. The combination with the chute and conveyer, of the spring-operated gate in the chute, the ratchet-wheel, the rock-arm having the pawl, and connections between the wheel and gate for operating the latter at predetermined intervals, substantially as described.

FREDERICK A. FRICK.

Witnesses:
R. P. SPOONER,
JACOB STROBEL.